United States Patent [19]

Meister

[11] Patent Number: 5,039,895

[45] Date of Patent: Aug. 13, 1991

[54] MOTOR ARRANGEMENT HAVING A COIL

[75] Inventor: Pierre-André Meister, Bienne, Switzerland

[73] Assignee: ETA SA Fabriques d'Ebauches, Grenchen, Switzerland

[21] Appl. No.: 180,348

[22] Filed: Apr. 11, 1988

[30] Foreign Application Priority Data

Apr. 22, 1987 [CH] Switzerland ............... 01549/87

[51] Int. Cl.⁵ .............................................. H02K 11/00
[52] U.S. Cl. ............................................ 310/68; 310/184; 310/268; 357/51; 318/254
[58] Field of Search ............... 310/268, 179, 68 R, 310/156, 208, 40 MM, 90, 180, 207, 184, 206; 29/602.1; 357/51; 361/392, 395; 368/87, 88; 427/96; 318/254

[56] References Cited

U.S. PATENT DOCUMENTS

| | | | |
|---|---|---|---|
| 3,796,039 | 3/1974 | Lucien | 310/268 UX |
| 3,988,024 | 10/1976 | Watanabe | 310/268 |
| 4,340,833 | 7/1982 | Sudo | 310/268 |
| 4,348,751 | 9/1982 | Kosaka | 368/87 |
| 4,733,115 | 3/1988 | Barone | 310/268 |
| 4,737,672 | 4/1988 | Kazami | 310/68 R |
| 4,801,830 | 1/1989 | Ogino | 310/268 |

FOREIGN PATENT DOCUMENTS

| | | |
|---|---|---|
| 0090551 | 7/1981 | Japan . |
| 0156253 | 8/1985 | Japan . |
| 1390666 | 10/1985 | Japan . |
| 0225449 | 11/1985 | Japan . |

*Primary Examiner*—R. Skudy
*Attorney, Agent, or Firm*—Weil, Gotshal & Manges

[57] ABSTRACT

The motor arrangement comprises a stator (2), a rotor (1) consisting of a magnetized disc (4) and of a first plate (5) made of soft magnetic material covering one side of the disc (4), and a module (24) secured to the stator (2), facing the other side of the disc (4), through the intermediary of a second plate (6) also made of soft magnetic material. The module (24) is a plate of selenium having an integrated control circuit and, on its surface facing the rotor (1), flat coils that are connected to the circuit and that intercept the field created by the rotor. The coils, which are formed by a single layer of turns, are produced during the manufacturing process of the integrated circuit, and the metallization mask used during this process includes, to this end, the pattern of the conductors that form the coil's turns and of the connections between the circuit and the coils.

4 Claims, 3 Drawing Sheets

MOTOR ARRANGEMENT HAVING A COIL

INTRODUCTION

This invention is concerned with miniature stepping motors comprising a stator, a magnetized rotor, and at least one coil that is magnetically coupled to the rotor and which is connected to a control circuit that supplies the coil with the current pulses needed to move the rotor, the motor that is associated with the control circuit forming a motor arrangement.

The invention relates to such arrangements, particularly those used in timepieces and more particularly watches.

The motor most used nowadways in watches is a Lavet type stepping motor. In this motor, a magnetized rotor of cylindrical shape sets up a radial magnetic field in the air gap of a magnetic circuit on which is wound a coil whose terminals are connected to a control circuit, usually an integrated circuit, that supplies current pulses, each pulse causing the rotor to move forward one step. The coil is formed by a very fine wire wound on a hollow insulating tube containing inside it a portion of the magnetic circuit. The cost of the wire and the difficulty of winding it on the tube and of producing reliable connections cause the coil to be the most expensive component of the motor.

Another type of motor is sometimes used in watches. In that case the rotor is shaped as a thin, magnetized disc that sets up in the air gap of the magnetic circuit axial fields that extend through flat, i.e. substantially plane and thin, coils arranged parallel with the rotor. As this type of motor uses six to eight coils of thin copper wire that are difficult to produce and to connect to each other and to the control circuit, it is even more expensive to manufacture than the Lavet motor. That is why this motor, which lends itself well to a compact construction, is hardly used in the watchmaking field. It has been possible to achieve a substantial price reduction for the coils by producing them simultaneously on a printed circuit, as described in detail in U.S. Pat. No. 4,340,833. This technique, albeit of interest to industrial motors, even motors of small size, is however inapplicable to the watchmaking field as it is not suited to the production of coils having sufficiently fine turns to achieve an efficient motor.

The above examples show that the stepping motors at present being used in watches are expensive and unreliable because, respectively, of the cost of the coils and of the difficulty of connecting them to the control circuit.

SUMMARY OF THE INVENTION

An object of the invention is to mitigate these drawbacks by providing a motor arrangement comprising:
 a stator;
 a rotor having a flat, magnetized disc-like portion, rotatably mounted in the stator and including at least one pair of magnetic poles to produce a field that is substantially parallel to the axis of rotation of the rotor in an air gap defined by the stator and the rotor; and
 at least one substantially flat coil placed in the air gap at right angles to said axis of rotation, such as to intercept the flux created by the field;
 wherein said coil is arranged on one surface of a semiconductor plate in which is implanted an integrated control circuit, said circuit being directly connected to said coil to supply it with drive pulses.

The arrangement provided by the invention is an improvement of the arrangement formed by the motor using flat coils and by the control circuit associated with the motor.

One advantage of the invention stems from the fact that the coils and the control circuit form a single module, of small size, that can be mass produced cheaply.

Another advantage stems from the fact that the module both simplifies the assembly of the arrangement and improves its reliability. A further advantage is that the module enables the size of the motor arrangements to be reduced.

Other features and advantages of the motor arrangement according to the invention will become apparent from the following description.

BRIEF DESCRIPTION OF THE DRAWINGS

In the accompanying drawings, in which the same references have been used to designate corresponding parts.

DETAILED DESCRIPTION

Figure 1B:
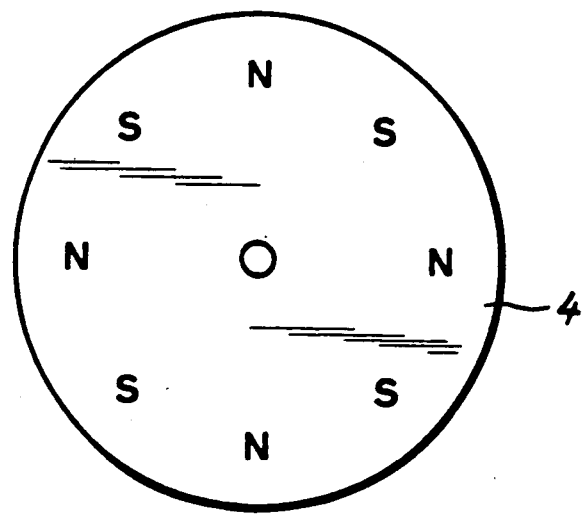
FIG. 1b is a plan view of the FIG. 1a motor's rotor showing the lay-out of the magnetic poles.
Figure 1A:
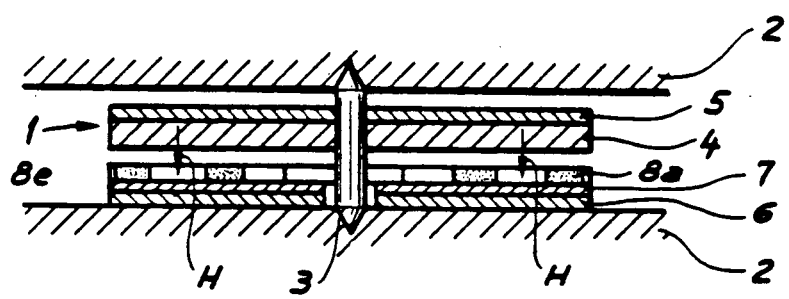
FIG. 1a is a cross-sectional view of a prior art motor comprising a thin, disc shaped, magnetized rotor and flat coils.

The prior art motor shown in FIG. 1a comprises a rotor 1, a stator 2 and a shaft 3 solid with rotor 1 and rotatably mounted in stator 2. Stator 2 is preferably made up, in the case of a watch motor, of parts of the movement's bottom plate and rotor 1 consists of a magnetized circular disc 3, near one end of shaft 3, and of a first circular plate 5 of soft magnetic material, plate 5 being secured to the side of disc 4 closest to stator 2. The motor further comprises, on stator 2, a second circular plate 6 having the same shape as plate 5, an insulating sheet 7 and eight flat coils 8a, 8b, ..., 8h. Plate 6 is secured to the portion of stator 2 facing the free side of disc 4, the space between plate 6 and rotor 1 defining an air gap. Coils 8a, 8b, ..., 8h lie in the air gap on plate 6, sheet 7 being sandwiched between plate 6 and the coils to insulate the plate from the coils.

FIG. 1b shows disc 4 and the lay-out of the magnetic poles, the disc being preferably made of ferrite or samarium-cobalt. In the illustrated embodiment, disc 4 comprises four pairs of magnetic poles arranged in the vicinity of the rotor's periphery. These poles set up magnetic fields H in the air gap between rotor 1 and stator 2 where coils 8a, ..., 8h are located. In the air gap, fields H all extend substantially parallel to the rotor's axis of rotation, but in alternate directions. Beyond the air gap, the fields are channelled from one magnetic pole to the adjacent pole by plates 5 and 6 having, for this purpose, high magnetic permeability. If the portion of stator 2 close to coils 8a, . . ., 8h were made of soft magnetic material, plate 6 would of course be otiose.

Figure 1C:
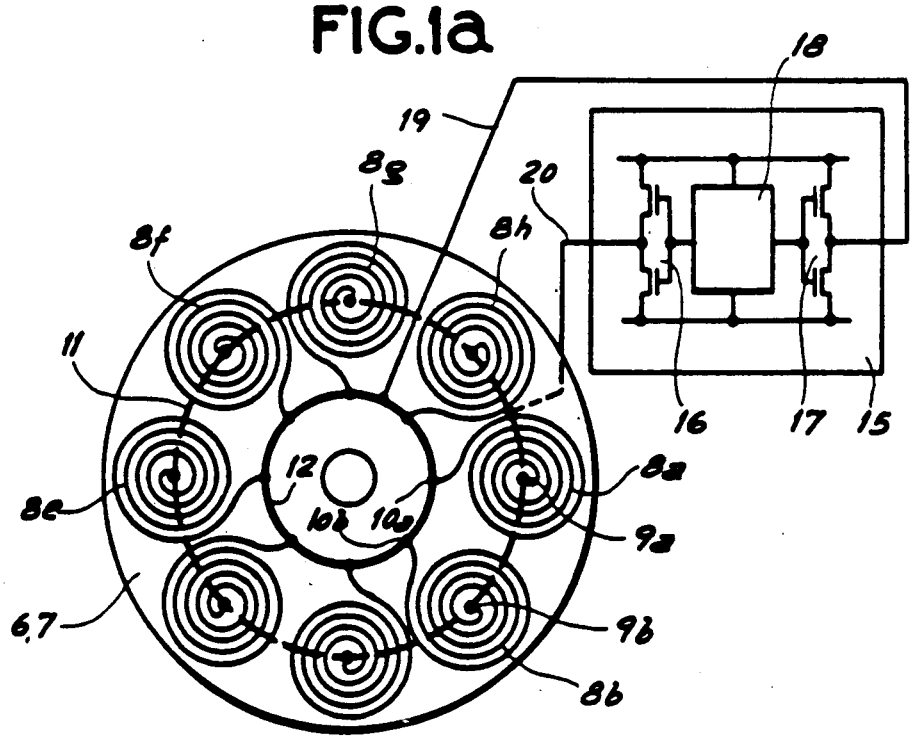
FIG. 1c is a plan view of the FIG. 1a motor's coils and of the coil's connections to a control circuit.

The shape and lay-out of coils 8a, . . ., 8h are shown in FIG. 1c. These coils, which are similar, in the form of plane, circular discs having little thickness in relation to their outer diameter, are so arranged as to intercept as much as possible of the flux set up by magnetic fields H in the air gap. Each coil, made of very thin copper wire, has an input terminal and an output terminal, these terminals being respectively referenced 9a and 10a for coil 8a, 9b and 10b for coil 8b, etc. Further, in the illustrated embodiment, firstly, the turns of a coil are wound one way and the turns of an adjacent coil are wound the other way and, secondly, all of the coils' input terminals are connected to one another by a conductor 11 and all of the coils' output terminals are connected by a conductor 12. Thus, currents having the same direction flow in neighbouring portions of the turns of two adjacent coils in response to a voltage applied to conductors 11 and 12.

FIG. 1c further illustrates a control circuit 15. Circuit 15, generally produced in the form of an integrated circuit implanted in a silicon wafer or chip, is intended to supply current drive pulses to the coils to drive rotor 1. Circuit 15 includes a pair of inverters 16 and 17 and a logic circuit 18. The outputs of inverters 16 and 17 are respectively connected to conductors 11 and 12 by wires 19 and 20, whereas their inputs are directly connected to circuit 18.

If the motor arrangement is intended for a watch, logic circuit 18 essentially comprises a time base circuit that is frequency stabilized by a quartz resonator, a frequency divider, and a circuit for shaping the signals applied to inverters 16 and 17, inverters 16 and 17 the supplying polarized drive pulses to the motor's coils. Logic circuit 18 also comprises at least one input terminal for time setting the watch by means of signals supplied by at least one outside control member. Control circuit 15 is moreover supplied with energy by a cell fitted inside the watch case. These circuit parts and these components, which are known per se, have not been shown in FIG. 1c, nor will they be described.

The above described motor arrangement may be designed in slightly different, but known, ways. In particular, to increase the length of the active portions of the coil's turns and to improve the motor's efficiency, coils 8a, . . ., 8h are best given a triangular shape, similar to that illustrated in FIG. 5 of U.S. Pat. No. 4,340,833. Also, the coils, instead of being connected in parallel, could be connected in series. Further, each coil could also be connected directly to a pair of inverters, circuit 15 then comprising as many pairs of inverters, similar to inverters 16 and 17, as there are coils.

The present invention proposes, when control circuit 15 is an integrated circuit, to simplify the above motor arrangement and to make it more reliable by gathering, into a single module, the circuit, the coils and the connections between the circuit and the coils.

Figure 2:
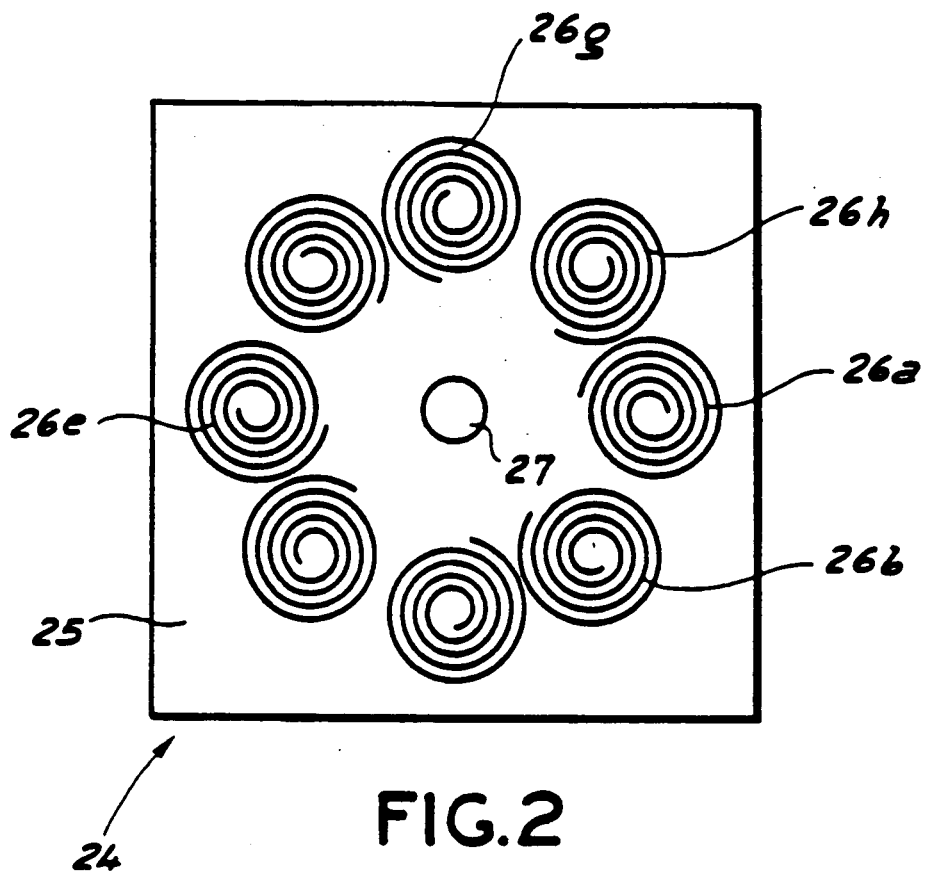
FIG. 2 is a plan view of a module according to the invention consisting of a silicon chip formed with coils on one side thereof and in which is implanted an integrated control circuit whose output is connected to the coil's terminals.

Such a module, referenced 24, is shown in plan in FIG. 2. It comprises a silicon chip 25 also called a semiconductor substrate or wafer, an integrated control circuit not shown, produced in accordance with CMOS technology and implanted in the substrate, and eight coils 26a, 26b, . . ., 26g, 26h arranged on one side of chip 25 at the center of which is formed a hole 27 through which extends the rotor's shaft 3. Coils 26a, . . ., 26h which are directly connected to the control circuit, have the same function as coils 8a, . . ., 8h.

In the case of a motor arrangement for a watch, chip 25 is square and typically has 4 mm sides and a thickness of 0.2 mm, whereas coils 26a, . . ., 26h have an outer diameter of about 1 mm and negligible thickness. In these conditions, the diameter of rotor 1 is about 5 mm. Further, disc 4 and plates 5 and 6 respectively have a thickness of about 0.4 mm and 0.3 mm. The overall thickness of the motor, arrangement assuming there is a space of 0.1 mm between disc 4 and coils 26a, . . ., 26h, would then be 1.3 mm.

Figure 3:
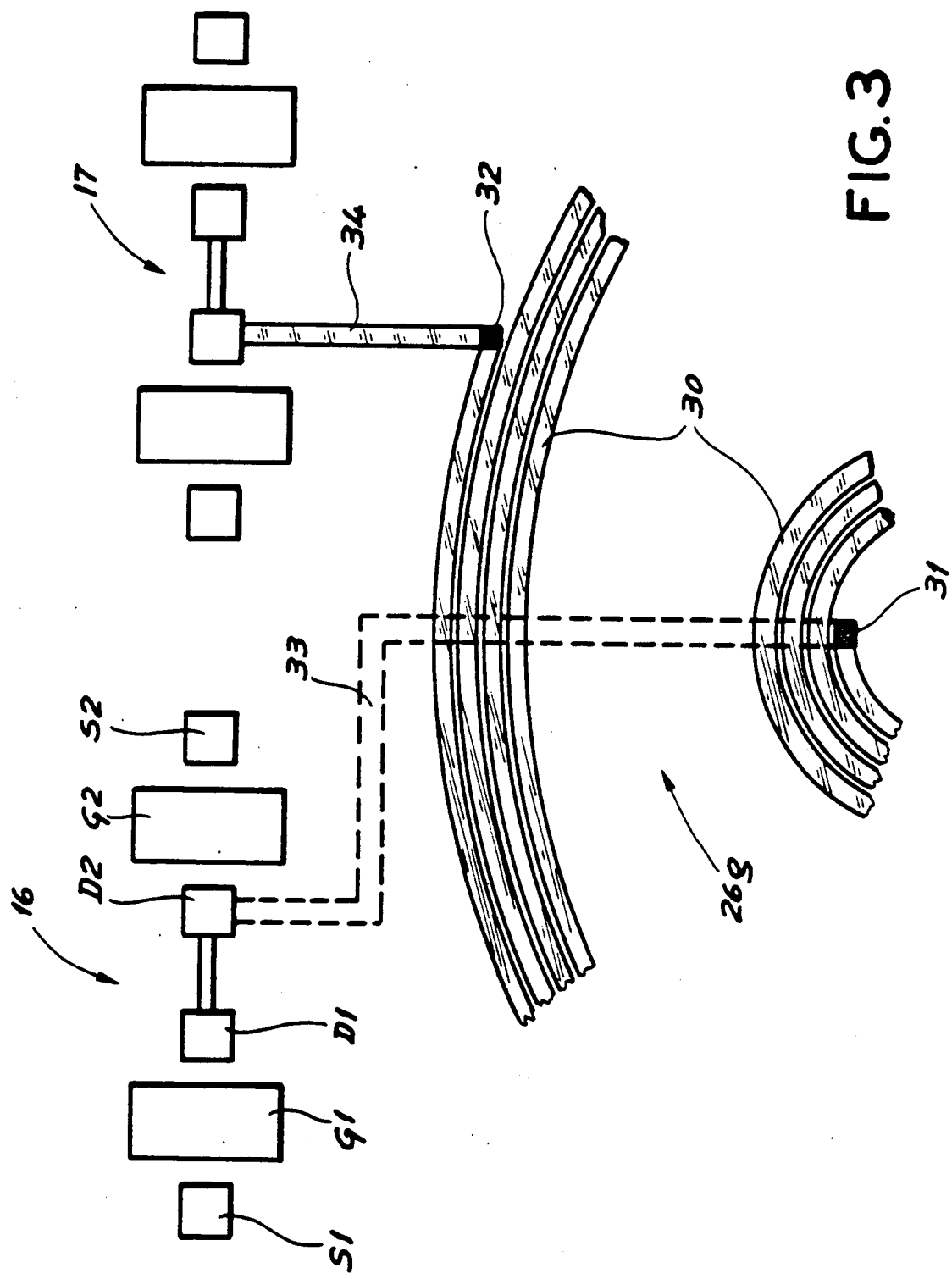
FIG. 3 is an enlarged plan view of a portion of the chip shown in FIG. 2 showing one coil and its connection to the control circuit.

FIG. 3 shows, in part, coil 26g, the two inverters 16 and 17 of integrated control circuit 15 and the connections between the ends of the coil and the inverters' outputs.

Coil 26g has about 150 turns. It is formed by an aluminium conductor 30 spirally wound in a single layer, with adjacent coils being distant by about one micrometer. Conductor 30, which has an inner terminal 31 and an outer terminal 32, has a square cross-section of 2 by 2 micrometers and a resistance between the terminals, corresponding to the coil's resistance, of about 2000 ohms. Coil 26g, in the illustrated embodiment, is circular but could of course be triangular to improve the efficiency of the motor arrangement.

Inverter 16, shown in FIG. 3, is made up of a pair of complementary CMOS transistors, each comprising a source, a gate and a drain, respectively referenced $S_1$, $G_1$ and $D_1$ for the first transistor and $S_2$, $G_2$ and $D_2$ for the second. Drains $D_1$ and $D_2$ are connected to one another and form the output of inverter 16. This output is connected to terminal 31 by an electric conductor 33. Inverter 17 has a structure identical to that of inverter 16 and its output is connected to terminal 32 by an electrical conductor 34. The other coils may be connected in parallel with coil 26g.

However, to reduce the length of the connecting conductors, it is best to connect each coil directly to a pair of inverters identical to inverters 16 and 17. The remainder of the control circuit and of the connections has not been shown. Since these elements take up relatively little space they can for instance be implanted in one of the corners of chip 25.

Coils 26a, . . ., 26h are preferably produced on silicon chip 25 by the same process, and at the same time, as that used to produce in this chip the integrated control circuit, without any additional production step.

In order to understand how the coils are made, it should first be recalled that the manufacture of an integrated MOS circuit involves several steps, the main ones being:
- diffusing into the silicon substrate through a succession of masks of impurities in well-defined locations to form the various active and passive components of the circuit;
- covering the surface of the circuit with an insulating layer of silicon oxide;
- forming openings in the oxide layer where the circuit provides connection terminals; and
- depositing through a metallizing mask, by a metallization process in vacuo, conductive tracks of aluminim selectively connecting to one another the connection terminals.

If the metallizing mask also outlines the coils' turns and their connections with the circuit, the coils and the connections between the coils and the circuit will of course be produced at the same time and by the same process as the other metallizations. The fineness of definition that can be achieved for the conductors with the metallization process is moreover compatible with the small dimensions, given above, that are needed for the coils and the conductors forming the turns, to achieve good efficiency for the motor.

MOS integrated circuit technology thus makes it possible to produce module 24, without any additional manufacturing step, i.e. a module in which the control circuit, the coils and the coils' electric connections with the circuit are gathered on one and the same silicon substrate. These connections may be achieved either by metallilzation, when there is no crossing with another metallization, as for instance with conductor 34, or by means of a diffused conduction channel, of p type when the substrate is of n type, when there is a crossing, as is the case with conductor 33 which must pass under coil 26g.

Figure 4:
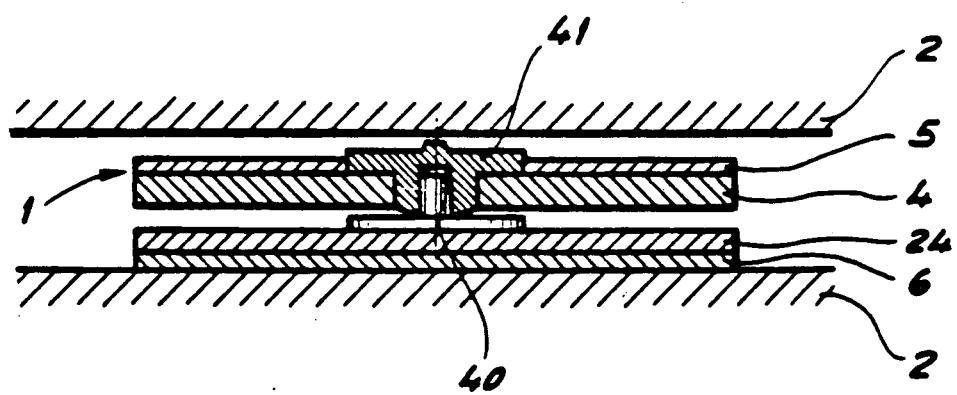
FIG. 4 is a plan view of a preferred form of embodiment of the motor arrangement according to the invention, said arrangement consisting of a motor and of a control circuit.

This module simplifies the construction of the motor arrangement by reducing the number of components. A preferred form of construction is shown in FIG. 4 in which elements 1, 2, 4, 5 and 6 designate the same elements as in FIG. 1a, i.e. the rotor, the stator, the magnetized disc and the two plates of soft magnetic material, respectively. Module 24 is secured directly to plate 6, instead of coils 8a, . . ., 8h in FIG. 1c, so that the side thereof bearing coils 26a, . . ., 26h should face the rotor. At its center, module 24 carries a round stud 40, which, by engaging in a bearing 41 fixedly mounted in the center of rotor 1, acts as a shaft about which rotor 1 may rotate. With this structure, module 24 need not be formed with a hole at its center, this being a delicate operation made necessary in the construction shown in FIG. 1a to let shaft 3 through.

The motor arrangement described with reference to FIGS. 2 to 4 may be modified in a variety of ways that will readily be apparent to those skilled in the art, within the scope of the following claims.

I claim:

1. A motor arrangement comprising:
   a stator;
   a rotor defining an axis of rotation and comprising a substantially flat magnetized disk-like portion rotatably mounted in said stator about said axis of rotation, said stator defining with said rotor an air gap;
   said substantially flat magnetized disk-like portion defining at least one pair of magnetic poles to produce a magnetic field which is substantially parallel to said axis of rotation and which crosses said air gap;
   said stator including a semiconductor chip facing said disk-like portion of said rotor and comprising a single silicon substrate having integrally formed therein at least one substantially flat coil, a control circuit for said motor and conductors for connecting said coil and said circuit directly to each other to allow supply of drive pulses from said circuit to said coil, said coil being arranged so as to intercept said magnetic field.

2. A motor arrangement according to claim 1, wherein said coil is formed by a single layer of turns.

3. A motor arrangement according to claim 1, wherein said chip has a central opening through which extends a shaft supporting said rotor, said shaft bearing on said stator.

4. A motor arrangement according to claim 1, wherein said chip carries a stud acting as a shaft about which said rotor may rotate.

* * * * *